UNITED STATES PATENT OFFICE.

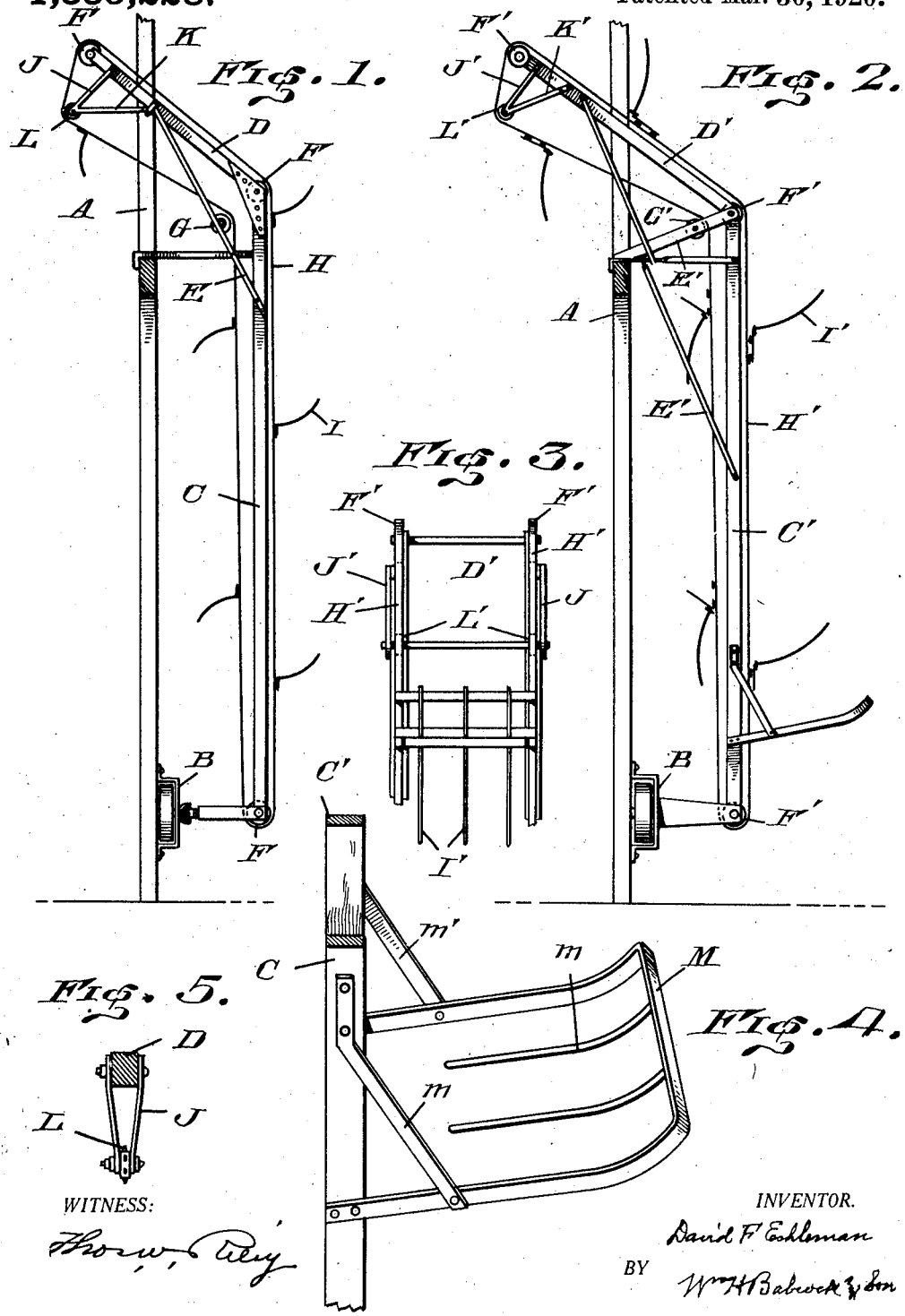

DAVID F. ESHLEMAN, OF WAYNESBORO, PENNSYLVANIA.

HAY-ELEVATOR.

1,335,228.   Specification of Letters Patent.   Patented Mar. 30, 1920.

Application filed April 15, 1919. Serial No. 290,135.

*To all whom it may concern:*

Be it known that I, DAVID F. ESHLEMAN, a citizen of the United States, residing at Waynesboro, in the county of Franklin and State of Pennsylvania, have invented certain new and useful Improvements in Hay-Elevators, of which the following is a specification.

This invention is an improvement on the subject-matter of Letters Patent No. 1,250,824 for hay elevators, granted to me December 18, 1917, which includes an endless sheaf carrier either of the one-chain or two-chain type running first vertically upward, then obliquely upward and rearward to the point of discharge, then returning in a line parallel or approaching parallelism to its upward course and consequently passing back toward the angle between the vertical and the inclined part of the carrier before its final vertical descent. This construction leaves the oblique discharging part of the carrier overhanging a space between the vertical part of the carrier and the side of the barn or other desired place of delivery.

In practice it is found that when the carrier is traveling fast the hay is often carried around past the discharging point and caused to drop in said space upon and about the lower part of the machine. To prevent such misdelivery is the chief object of the present invention. This I effect by causing the carrier to descend abruptly and obliquely outward from the point of discharge for a sufficient distance to insure the proper discharge of all the hay before said carrier begins to return obliquely downward and forward toward the vertical part of the frame.

In the accompanying drawings:

Figure 1 represents a side elevation of a single-chain elevator applied to the side of a barn and embodying my present invention.

Fig. 2 represents a perspective view of a two-chain elevator having a slightly modified arrangement of the carrier chains as they first travel downward.

Fig. 3 represents a detail rear elevation of the upper end of the double chain carrier.

Fig. 4 represents a detail view of the platform or table and neighboring parts, broken away; and Fig. 5 represents a detail view of arm J and sprocket wheel L (Fig. 1), the bar D being shown in section.

Most of the devices and parts shown in said drawings are substantially identical with those in the said patent and it is thought unnecessary to repeat its detailed description of them. A designates a wall of the barn and B the driving mechanism of the carrier, as shown in Fig. 1. C designates the vertical bar of the carrier frame; D, the oblique upwardly and rearwardly extending bar of said frame; E, a brace for those two bars extending across the angle thereof, and F, sprocket wheels on the frame respectively arranged at the bottom of bar C, the junction of bars C and D and the upper or discharge end of bar D. G designates another sprocket wheel on brace E, and H an endless elevating single-chain conveyer running over said sprocket wheels and provided with hay forks I at convenient intervals. The sheaf or armful of hay, being taken up by one of these forks, is carried up vertically to the end of bar C, then upwardly and rearwardly to the upper end of bar D, which is the discharging point.

In practice it has been found, as before stated, that the forks I, when the chain runs rapidly, will often carry the hay past the discharging point and back under the machine. To guard against this, I make the carrier run abruptly downward from the discharge point and away from the frame sufficiently far to insure the proper delivery of the hay within the barn at the point of discharge. This is effected, as shown in Fig. 1, by an additional sprocket wheel L held almost vertically below the uppermost sprocket wheel F by a short bifurcated arm J, which is attached to bar D and strengthened by a brace K connected to brace E. This arm preferably consists of two converging plates attached at their upper ends to opposite sides of bar D. The chain passes abruptly down to and around this sprocket wheel L and all the hay will be deposited during this passage. After leaving sprocket wheel L the carrier chain continues its course to sprocket wheel G and thence to the lowest wheel F, as usual.

It is not necessary that the descent from the uppermost wheel F to wheel L should be vertical. As shown in Fig. 2, the position of the supplemental wheel or wheels may be more to the rearward; it being chiefly necessary that the direction of travel in this part of the course should be at first away from the frame and from the main course of the carrier. Since Fig. 2 represents a two-chain carrier, there are shown therein two parallel vertical frame bars C' corresponding to bar C aforesaid, also two oblique upward and rearward frame bars D, two sets of sprockets F' corresponding to sprockets F, two sprocket wheels G' corresponding to wheel G, two braces E' corresponding to brace E, and two carrier chains H' corresponding to carrier chain H. Some of these parts differ a little in form from those in Fig. 1, but the variations are immaterial. Instead of the two-tine form of hay fork I shown in Fig. 1, a three-tine form of hay fork I' is used in Fig. 2 and these forks are mounted on transverse bars or flights connected to the chains. There are two supplemental sprocket wheels L' (one wheel for each chain) corresponding to sprocket wheel L, and they are mounted on arms J' extending rearwardly from the bars D. These may be braced in any convenient manner. The operation is the same as in Fig. 1, excepting the more rearward direction of the chain in passing from upper sprocket wheel F to sprocket wheel E.

For the two-chain elevator it is best to provide a platform or table M, hung to bars C and of such open construction that the chains and hay-carrying devices may pass freely up through it, though said table has fingers m, out of the way of the hay fork tines, for supporting the sheaves, as these are laid horizontally upon it. The frame of this table is U form, the curved outer part thereof being bent upward for better retention of the hay. Its position as a whole is nearly horizontal and it is provided with upwardly and rearwardly extending brace arms m' connected at their upper ends to bars C.

The sheaves are placed horizontally on this table and taken up therefrom by the forks on the carrier.

Of course, elevators such as above described may be used for straw or any other material besides hay. For example, corn fodder, bags or bundles may be carried up by them, and the abrupt bend downward and outward of the carrier from the discharge point will insure the proper delivery of such articles. But the primary purpose of such carriers is to elevate and carry rearward sheaves or armfuls of hay or straw and deposit them accurately within a barn or on any other spot designated without spilling the hay over and about the base of the machine.

Having thus described my invention, what I claim as new and desire to secure by Letters Patent is:

1. In an elevator for hay and other loose materials, an endless traveling carrier consisting of a vertical part, a part upwardly and rearwardly inclined to the point of discharge and a supplemental part extending abruptly downwardly at the beginning of the return flight, making an abrupt angle with the inclined part of said carrier to insure the proper discharge of the hay.

2. In an elevator for hay and other loose materials, an endless traveling carrier consisting of a vertical part, a part extended rearwardly and not downwardly therefrom to the point of discharge, and a supplemental part extending abruptly downwardly at the beginning of the return flight, making an abrupt angle with the said rearwardly extended part of the carrier to insure the proper discharge of the hay or like material.

3. In combination with an elevator frame having a rearwardly and upwardly inclined part, an endless carrier for hay and loose materials traveling up over said frame and returning on the other side thereof along said frame, wheels for said carrier supported by said frame to guide its movement in both directions, an arm extending rearwardly and downwardly away from said frame near the point of discharge, and an additional wheel carried by said arm to guide said chain abruptly downward and rearward from said point of discharge at the beginning of its return flight, for the purpose set forth.

In testimony whereof, I have signed my name to this specification in the presence of two subscribing witnesses.

DAVID F. ESHLEMAN.

Witnesses:
SIMONE GIANCOLI,
JOHN SHIELDS.